(12) United States Patent
Hong et al.

(10) Patent No.: US 9,326,042 B2
(45) Date of Patent: Apr. 26, 2016

(54) ROUTING METHOD FOR INTER/INTRA-DOMAIN IN CONTENT CENTRIC NETWORK

(71) Applicant: SAMSUNG ELECTRONICS CO., LTD., Suwon-si (KR)

(72) Inventors: Seong Ik Hong, Suwon-si (KR);
Byoung Joon Lee, Seongnam-si (KR);
Myeong Wuk Jang, Hwaseong-si (KR);
Jae Hoon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 13/914,845

(22) Filed: Jun. 11, 2013

(65) Prior Publication Data

US 2013/0332955 A1     Dec. 12, 2013

(30) Foreign Application Priority Data

Jun. 11, 2012  (KR) .................. 10-2012-0062147
Mar. 11, 2013  (KR) .................. 10-2013-0025697
May 14, 2013  (KR) .................. 10-2013-0054188

(51) Int. Cl.
*H04N 21/647*   (2011.01)
*H04N 21/2183*  (2011.01)
*H04N 21/20*    (2011.01)
*H04N 21/231*   (2011.01)
*H04N 21/21*    (2011.01)
*H04L 12/715*   (2013.01)
*H04L 29/08*    (2006.01)
*H04L 12/751*   (2013.01)
*H04L 12/725*   (2013.01)

(52) U.S. Cl.
CPC .......... *H04N 21/64784* (2013.01); *H04L 45/04* (2013.01); *H04L 67/306* (2013.01); *H04N 21/20* (2013.01); *H04N 21/21* (2013.01); *H04N 21/2183* (2013.01); *H04N 21/23113* (2013.01); *H04N 21/23116* (2013.01); *H04L 45/025* (2013.01); *H04L 45/308* (2013.01)

(58) Field of Classification Search
None
See application file for complete search history.

(56) References Cited

U.S. PATENT DOCUMENTS

| | | | | |
|---|---|---|---|---|
| 5,721,921 | A * | 2/1998 | Kessler et al. | 718/102 |
| 6,697,857 | B1 * | 2/2004 | Dixon et al. | 709/224 |
| 2004/0025176 | A1 * | 2/2004 | Franklin et al. | 725/22 |
| 2006/0182126 | A1 * | 8/2006 | Yuen et al. | 370/400 |
| 2009/0287835 | A1 | 11/2009 | Jacobson | |
| 2010/0232433 | A1 * | 9/2010 | Morris | 370/392 |
| 2011/0078726 | A1 * | 3/2011 | Rosenberg et al. | 725/34 |
| 2011/0265174 | A1 | 10/2011 | Thornton et al. | |
| 2012/0096312 | A1 * | 4/2012 | Turner et al. | 714/19 |
| 2012/0158861 | A1 | 6/2012 | Mosko et al. | |
| 2012/0158912 | A1 | 6/2012 | Jacobson | |
| 2012/0204224 | A1 | 8/2012 | Wang et al. | |
| 2012/0317307 | A1 * | 12/2012 | Ravindran et al. | 709/238 |

FOREIGN PATENT DOCUMENTS

| | | |
|---|---|---|
| KR | 10-2011-0125481 A | 11/2011 |
| KR | 10-2012-0038187 A | 4/2012 |
| KR | 10-2012-0060565 A | 6/2012 |
| KR | 10-2012-0067949 A | 6/2012 |
| KR | 10-2012-0067953 A | 6/2012 |

\* cited by examiner

*Primary Examiner* — Justin Shepard
(74) *Attorney, Agent, or Firm* — NSIP Law

(57) ABSTRACT

An intra-domain routing method in a content centric network (CCN), includes generating a packet requesting information requested by a node, the packet including an area to which the information is to be advertised, and transmitting the packet within the area.

27 Claims, 9 Drawing Sheets

ROUTING METHOD FOR INTER/INTRA-DOMAIN IN CONTENT CENTRIC NETWORK

CROSS-REFERENCE TO RELATED APPLICATIONS

This application claims the benefit under 35 USC 119(a) of Korean Patent Application No. 10-2012-0062147, filed on Jun. 11, 2012, Korean Patent Application No. 10-2013-0025697, filed on Mar. 11, 2013, and Korean Patent Application No. 10-2013-0054188, filed on May 14, 2013 in the Korean Intellectual Property Office, the entire disclosures of which are incorporated herein by reference for all purposes.

BACKGROUND

1. Field

The following description relates to a routing method for an inter-domain and an intra-domain in a content centric network (CCN).

2. Description of Related Art

In a content centric network (CCN), packets are classified into content request packets and content reply packets. A content request packet, also referred to as an interest packet, includes a name of a requested content. A content reply packet includes a requested content and a name of the requested content.

When a network device receives a content request packet from a requester, the network device may look up a storage space of the network device by a name of a requested content in a header of the content request packet. When the corresponding requested content is present in the storage space, the network device may deliver the corresponding requested content to the requester. Unlike in an Internet Protocol (IP)-based network, in which content may be obtained from an original owner of the content, in a CCN, any intermediate node in which a requested content is cached in a storage space, may send a content reply packet. Accordingly, an average length of a transmission path may be reduced, and as a result, an overall usage of the CCN may be reduced.

SUMMARY

In one general aspect, there is provided an intra-domain routing method in a content centric network (CCN), the method including generating a packet requesting information requested by a node, the packet including an area to which the information is to be advertised, and transmitting the packet within the area.

In another general aspect, there is provided an inter-domain routing method in a content centric network (CCN), the method including determining whether another domain transmitting, to a node, a packet requesting content, is associated with a policy. The method further includes searching for content stored in the node based on a result of the determination, and transmitting the content stored in the node in response to the content stored in the node matching the content requested by the other domain.

In still another general aspect, there is provided a node in a content centric network (CCN), the node including a packet generating unit configured to generate a packet requesting information requested by the node, the packet including an area to which the information is to be advertised, and a transmitting unit configured to transmit the packet within the area.

Other features and aspects will be apparent from the following detailed description, the drawings, and the claims.

DETAILED DESCRIPTION

Figure 1:
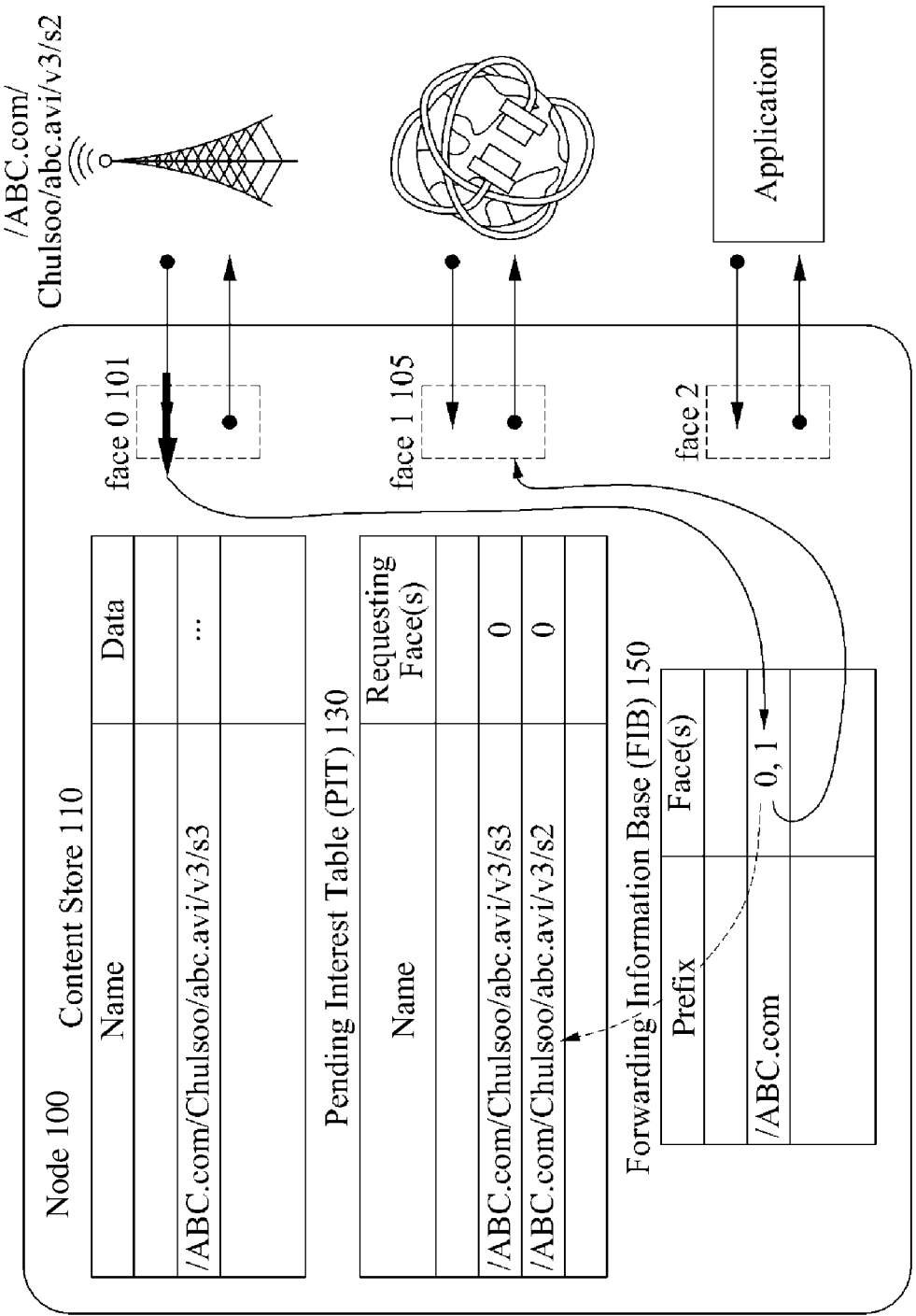
FIG. 1 is a diagram illustrating an example of a method of processing a content request packet in a content centric network (CCN).

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, the term "node" used herein may include a user terminal (for example, a smartphone, a smart TV, a personal computer (PC), and/or a laptop computer), a customer device (for example, a robot cleaner), and/or a device in a content centric network (CCN) (for example, an access point).

FIG. 1 illustrates an example of a method of processing content request packet in a CCN. An information centric network (ICN) includes all entities encompassing services and devices as well as contents served in the CCN. The method described in the following may be performed equally in the ICN.

In the CCN, a name of content functions as a compass to find a node in which the corresponding content is stored, and functions to distinguish the corresponding content from other content. Accordingly, each content includes a unique name, and contents including different names may be regarded as different contents even though the same information is included in the contents. For example, when two files include the same information, but include different names, for example, "/ABC.com/sait/video/intro.avi" and "/ABC.com/sait/comm/video/intro.avi", the two files are processed as different contents. This rule is useful in distinguishing different contents with similar names.

In FIG. 1, a method of processing the content request packet (e.g., an interest packet) based on a hierarchical name of a content included in the content request packet in a CCN is illustrated. For example, a node 100 included in the CCN receives, via a face 0 101 from, for example, another node, the content request packet requesting the content corresponding to the hierarchical name of the content, for example, "/ABC.com/Chulsoo/abc.avi/v3/s2". As used herein, the term "face" may be interchangeable with the term "interface".

A networking module of the node 100 determines whether the corresponding content is included in a content store 110 of the node 100 based on whether an entry stored with the same hierarchical name of the content, "/ABC.com/Chulsoo/abc.avi/v3/s2", is included in the content store 110. The content store 110 may be also referred to as a content cache. When the corresponding content is determined to be included in the content store 110, the node 100 returns the corresponding content to the face 0 101 used to receive the content request packet.

In contrast, when the corresponding content is determined to be absent in the content store 110, as shown in FIG. 1, the node 100 determines whether an entry stored with the same hierarchical name of the content, "/ABC.com/Chulsoo/abc.avi/v3/s2", is included in a Pending Interest Table (PIT) 130 of the node 100. When the entry stored with the same hierarchical name of the content is determined to be included in the PIT 130, as shown in FIG. 1, the node 100 adds information '0' of the face 0 101, namely, a requesting face, to the corresponding entry in the PIT 130.

When the entry stored with the same hierarchical name of the content is determined to be absent in the PIT 130, the node 100 further searches for the corresponding entry by performing a lookup of an entry in a Forwarding Information Base (FIB) 150 based on the hierarchical name of the content. In this example, the node 100 conducts a search for the entry, using longest prefix matching of a longest prefix of the hierarchical name of the content, "/ABC.com", with a prefix included in the entry.

Subsequently, the node 100 determines a face to be used to forward the content request packet, in this example, a face 1 105, based on information of the face that is registered in the entry of the FIB 150. The node 100 transmits the content request packet to the face 1 105, which may forward the content request packet to another node.

In this example, the node 100 registers, in the entry of the FIB 150, information '0' of the face 0 101 used to receive the content request packet. The registration is performed to deliver a data packet including a content to another node requesting the content when a content request packet is received in the future. Additionally, another face, other than the face 1 105, may be selected or determined based on the FIB 150 to be used to forward content request packet.

Figure 2:
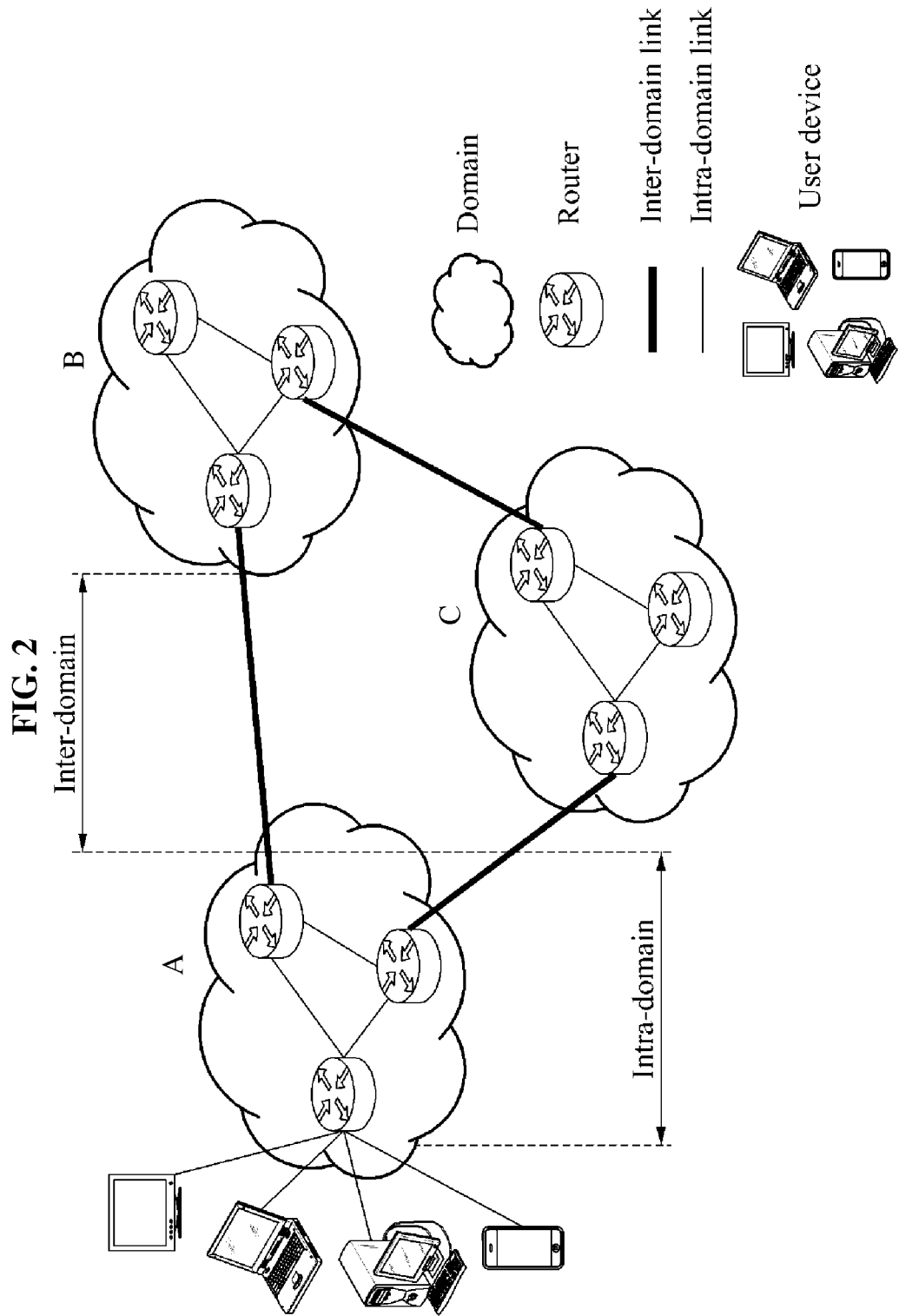
FIG. 2 is a diagram illustrating an example of a CCN including inter-domain routing and intra-domain routing.

FIG. 2 illustrates an example of CCN including inter-domain routing and intra-domain routing. Referring to FIG. 2, a routing method in the CCN may use an area-based hierarchy, similar to an Internet Protocol (IP)-based network. In the CCN, the area-based hierarchy includes an inter-domain network and an intra-domain network based on routing areas, and the routing method includes the inter-domain routing and the intra-domain routing.

Referring to FIG. 2, the term "inter-domain routing" refers to routing between different domains, for example, a domain A and a domain B, and the term "intra-domain routing" refers to routing between network devices, for example, routers, within a domain, for example, the domain A. A domain may be an autonomous system (AS), and may be managed by an Internet service provider (ISP). The inter-domain routing includes at least one inter-domain link, and the intra-domain routing includes at least one intra-domain link. Each of the routers may be connected to at least one user device.

Different routing approaches may be applied to the inter-domain network and the intra-domain network. For example, hybrid routing may be applied to the intra-domain network. The term "hybrid routing" includes content-level routing and publisher-level routing. A further detailed description of the hybrid routing is provided with reference to FIG. 5.

The CCN may be configured as an IP overlay or as a CCN layer upon a native layer 2 (L2). The routing method may be applied to the two configurations.

Figure 3:
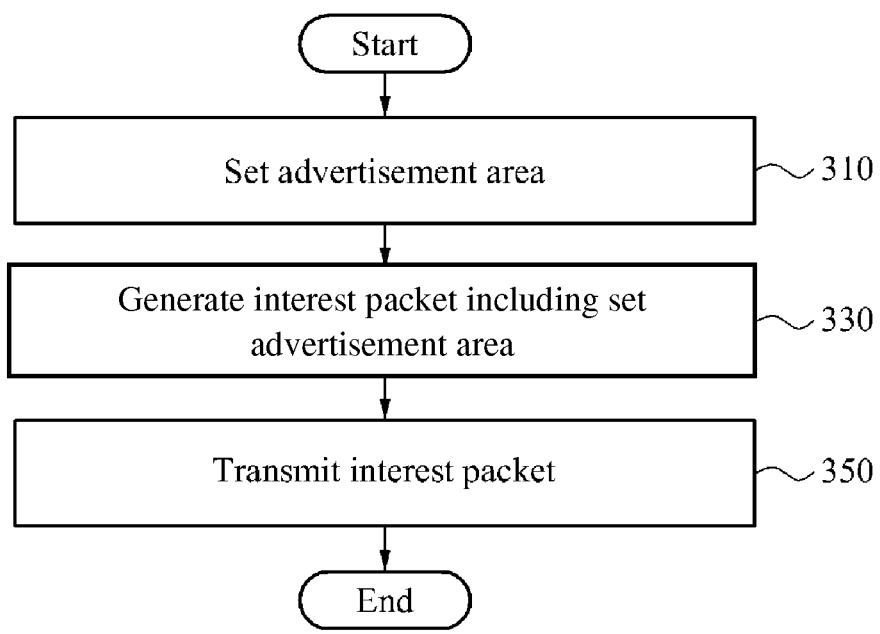
FIG. 3 is a flowchart illustrating an example of a method of advertising information requested by a node in an intra-domain network in a CCN.

FIG. 3 illustrates an example of a method of advertising information requested by a node in an intra-domain network in a CCN. Referring to FIG. 3, in operation 310, the node sets or determines an advertisement area. The advertisement area is an area to which information requested by the node is limited to be advertised. For example, the advertisement area may be set or determined based on an area input from a user through a customer device (e.g., the node), or an area preset as a default. In this example, the node may be included within the advertisement area.

In another example, the advertisement area may range from at least one other node, in which information of a similar or identical field to the information requested by the node is stored, to core routers connected to an Internet core on a hierarchical basis. In this example, the information may be of devices and services as well as contents. The other node may be determined based on the area input from the user, or the area preset as the default.

In operation 330, the node generates an interest packet including the set advertisement area. The interest packet may include a name of the information requested by the node and an operation ID (OID). The operation ID may designate at least one control operation to be performed by another node in the advertisement area in response to the interest packet being received. For example, the operation ID may designate content advertisement, content search, content storage, content deletion, content copying, content updating, content forwarding, content splitting, content combination, content encoding, content decoding, and/or content encryption.

In operation 350, the node transmits the interest packet within the advertisement area. In contrast, when the transmitted interest packet is outside of the advertisement area, the node and/or a node receiving the interest packet may revoke the interest packet.

Figure 4:
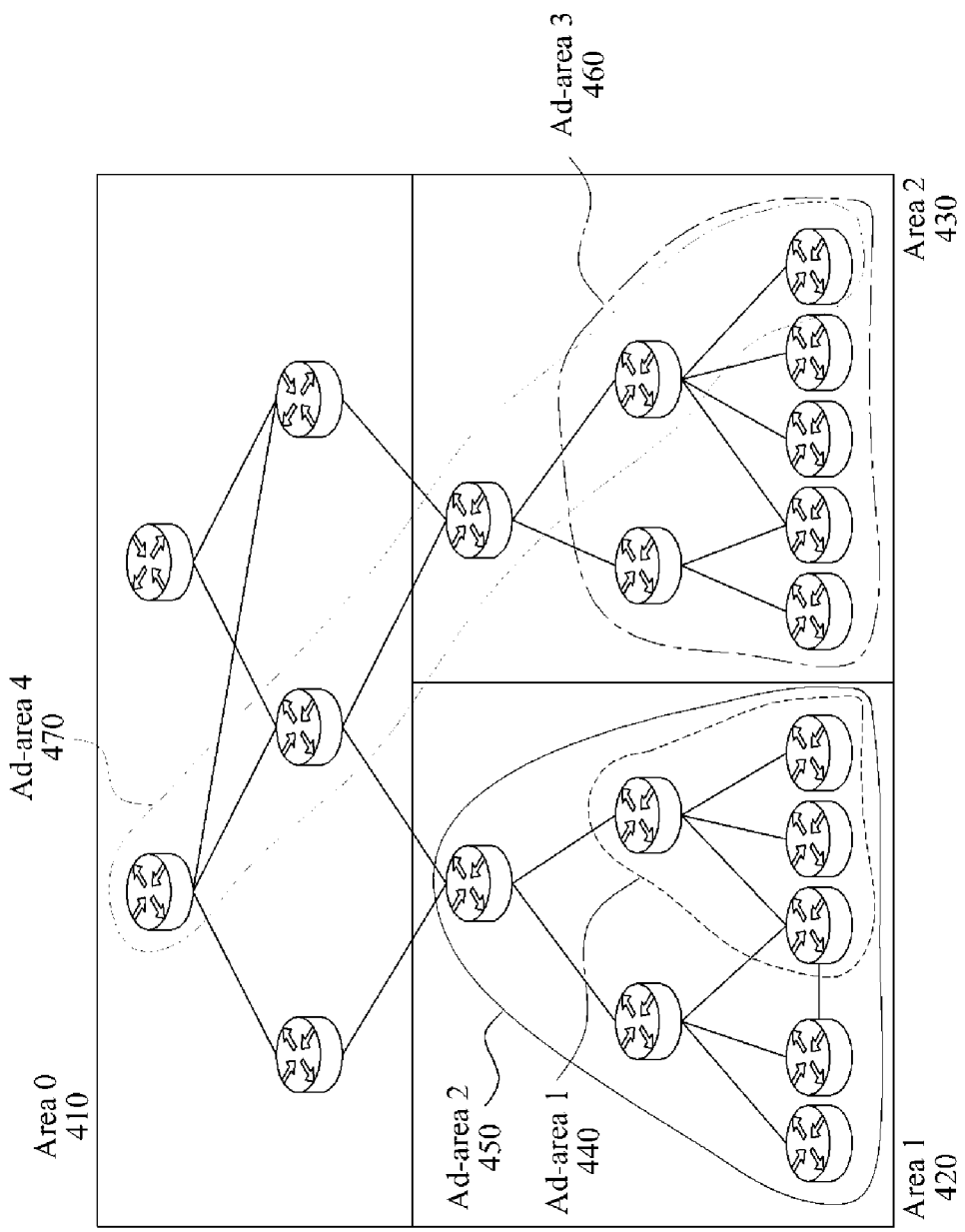
FIG. 4 is a diagram illustrating an example of a configuration and an area-based hierarchy of an intra-domain network in a CCN.

FIG. 4 illustrates an example of a configuration and an area-based hierarchy of an intra-domain network in a CCN. Routers in an intra-domain network in an IP-based network may be classified by area, and routing information may be exchanged only within each area. Referring to FIG. 4, an area 0 410 may be of a core router operating in a backbone, and each of an area 1 420 and an area 2 430 may be of an IP router.

This form of area classification may be also performed in the CCN. The area classification may be based on a fact that a size of a domain is not expected to be reduced in view of the intra-domain network in the IP-based network being currently-used, and may be intended to ensure intra-domain routing scalability for routing information exchange. Accordingly, the area-based hierarchy may be used in the examples described herein.

However, in the CCN, a FIB may be constructed with the goal of transmitting an interest packet requesting information. The FIB may be configured from advertisement or registration information being received for contents, but advertising all information may be impossible with respect to scalability. In more detail, since a large amount of various types of contents may be present and keep increasing, when all contents are advertised, a massive amount of advertisement information may cause network paralysis. In this example, the information may include contents, devices, and services.

Accordingly, the examples described herein may ensure scalability by limiting a range of advertising information requested by a node to an advertisement area, dissimilar to the intra-domain network in the IP-based network.

In this example, the advertisement area, abbreviated to "Ad-area", may be an area in which people with interests in similar contents gather in buildings on, e.g., a campus, an apartment complex, and/or an educational service district, and may include an area ranging from such an area to core routers connected to an Internet core. The advertisement area may be determined based on a range being set by a user or a customer device, or a limited or defined range of a preset default area.

For example, referring to FIG. 4, an Ad-area 1 440 may be an area in which people with interests in education-related contents, education-related services, and an education service providing apparatus gather. An Ad-area 2 450 may be an area in which people with interests in sports and travel-related contents and/or services, among education-related contents and/or services, gather. Also, an Ad-area 3 460 may be an area in which people with interests in movie contents and movie providing services gather.

The advertisement area may be set to be smaller in size and to permit hierarchical overlapping when compared to an IP-based area. Also, as shown in an Ad-area 4 470, the advertisement area may be set to be an area in which similar contents, services, and/or devices are shared orthogonally. Information sharing efficiency in a narrow area may be improved by advertising information in the limited advertisement area.

Also, the advertisement area may be used to find non-advertised information. That is, a broadcast area of an interest packet requesting non-advertised information may be localized by permitting the interest packet to be broadcast within the advertisement area. Using the advertisement area, reachability of the non-advertised content may be ensured while maintaining scalability of the CCN. This form of information advertisement may lead to a very high level of an information aggregation mechanism even though ensuring scalability in an inter-domain network on a global scale is difficult. If a cache hit policy for an aggregate information category is defined at a domain policy level, information may be advertised between domains.

Various examples of a method of advertising information are described herein. If information mapping is configured between a router and a terminal, information advertisement may be needed. In this example, a range of advertising information may be limited to popular information. Also, whether to advertise information after information aggregation may be determined in units of individual information, or may be determined based on properties of information.

Also, for transiently cached information, only information including a predetermined period of life or longer may be advertised, and temporarily cached information may not be advertised. Further, to adjust an amount of advertisement messages, a popularity level of information to be advertised may be adjusted based on the amount of the advertisement messages. In this example, an amount of control traffic of information advertisement may be maintained uniformly. The above description may be applied to information-level routing.

In an example, if a content that a user intends to find using information-level routing is absent in a local area, switching may be made to publisher-level routing to transmit an interest to a publisher of the content. This may be called hybrid routing. The publisher may be an original owner or originator of the content. The publisher-level routing may be also referred to as originator-level routing. A further detailed description of a method of transmitting an interest packet for a content using the hybrid routing is provided with reference to FIG. 5.

Advertised information routing in the intra-domain network may use, for example, a shortest path first algorithm of open shortest path first (OSPF) for the network being currently-used. Also, non-advertised content routing may be performed by broadcasting an interest packet within the advertisement area as described in the foregoing.

Figure 5:
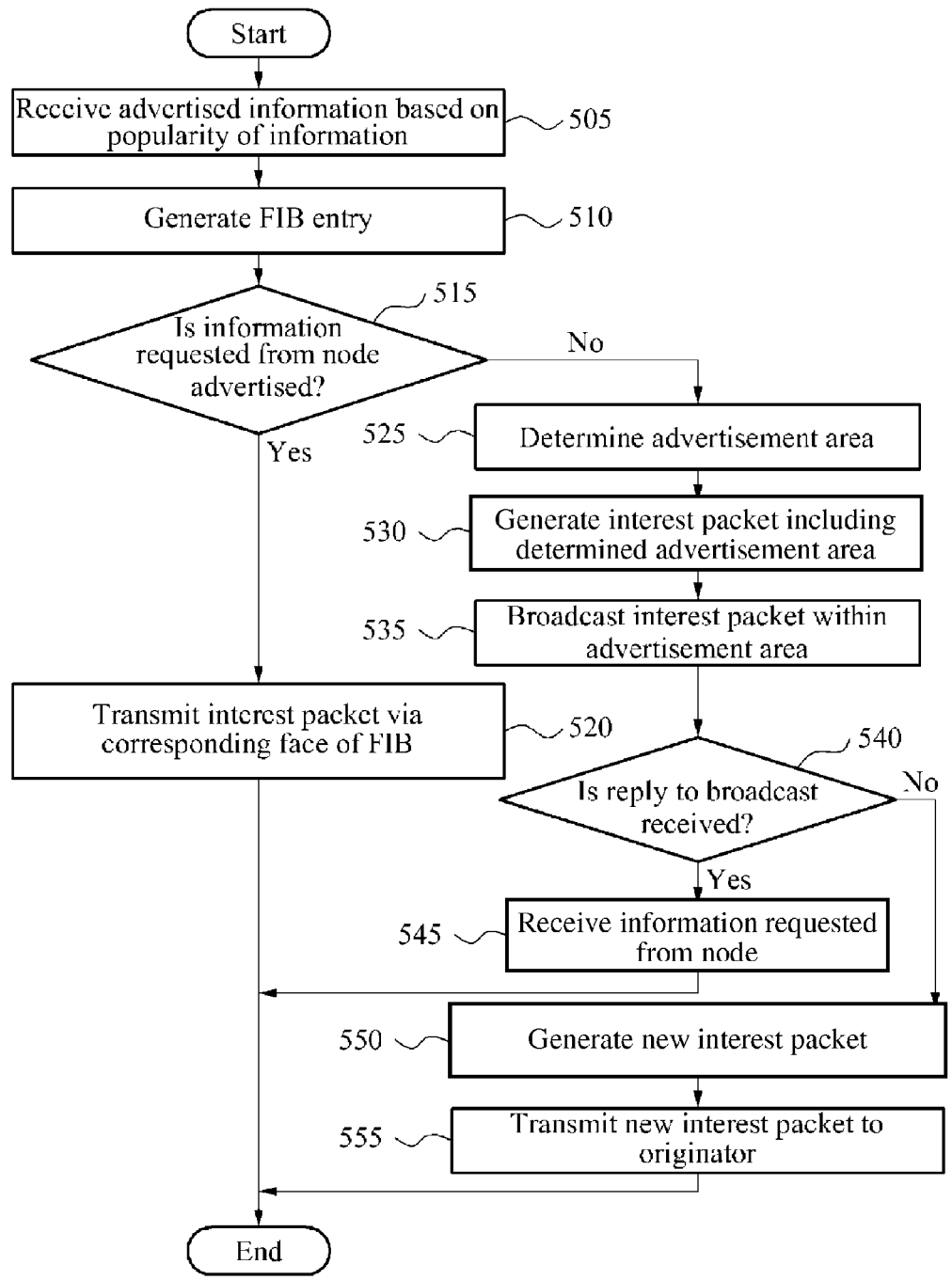
FIG. 5 is a flowchart illustrating an example of a routing method including a method of advertising information requested by a node in an intra-domain network in a CCN.

FIG. 5 illustrates an example of a routing method including a method of advertising information requested by a node in an intra-domain network in a CCN. Hereinafter, the term "node" as used in this description may include a node requesting information or content, namely, a requester, and a node providing the information or content requested by the requester, namely, a provider. The information may include the content.

Referring to FIG. 5, in operation 505, the node corresponding to a requester receives advertised information or content based on a popularity of the information or content. The advertised information is received from another node corresponding to a provider. The popularity of the information may be determined based on an access count of the information. When a number of interest packets requesting the corresponding information is greater than or equal to a preset value, the corresponding information may be determined to be popular information. The advertised information may include a list of information names stored in a content cache of the provider.

In operation 510, the node generates an FIB entry for the advertised information.

In operation 515, the node determines whether information requested by the node is advertised, based on the FIB entry. That is, the node determines the information requested by the node is equal to any of advertised information stored in respective FIB entries. When the information requested by the node is determined to be advertised, the node continues in operation 520. Otherwise, the node continues in operation 525.

In operation 520, the node transmits an interest packet requesting the information requested by the node, to the other node corresponding to the provider of the advertised information via a corresponding face of the FIB entry for the information requested by the node. The transmission of the interest packet requesting the information requested by the node, to the other node corresponding to the provider is termed as information-level routing. The information requested by the node may include contents, services, and/or devices, and may be aggregated based on various criteria, for example, properties. Subsequently, the method ends.

In operation 525, the node determines an advertisement area. The node may be included in the advertisement area. The advertisement area may range from at least one other node, in which information of a similar or identical field to the information requested by the node is stored, to core routers connected to an Internet core on a hierarchical basis.

In operation 530, the node generates an interest packet requesting the information requested by the node, and including the determined advertisement area.

In operation 535, the node broadcasts the interest packet requesting the information requested by the node within the advertisement area. A range of the other node that is used to transmit an advertisement thereto may be determined based on the advertisement area. The advertisement area is used to limit or define an area to which popular information is limited to be advertised. The term "broadcast" as used herein may refer to delivering a packet transmitted from an arbitrary node to all other nodes connected to a router or an access point, and/or sending packets from a source node via multicast to nodes in a real or virtual network.

In operation 540, the node determines whether a reply to the broadcast is received. That is, the node determines a content reply packet, in response to the broadcasted interest packet, is received from another node. When the reply to broadcast is determined to be received, the node continues in operation 545. Otherwise, the node continues in operation 550.

In operation 545, the node receives the information requested by the node and included in the reply, e.g., the content reply packet.

In operation 550, the node generates a new interest packet requesting the information requested by the node. The new interest packet may be an interest packet without an advertisement area.

In operation 555, the node transmits the new interest packet to an originator, namely, a publisher, of the information requested by the node. Also, the node may transmit the new interest packet directly to the originator, using longest prefix matching, e.g., a longest prefix (e.g., /kbs.com/) of a hierarchical name of the information requested by the node. The transmission of the new interest packet to the originator or publisher is termed publisher-level routing.

For unpopular information less useful for information-level routing, publisher-level routing may allow a transmission of an interest packet requesting information to a publisher through shortest path routing, absent advertising the information. The information may be aggregated by an organization hierarchy of the publisher. That is, publisher-level routing may refer to the transmission of the interest packet requesting the information to the publisher to request the publisher to transmit the information when the information is determined to be absent in a local area within a domain, for example, an advertisement area. In this example, the publisher may be called an author or owner of the information or content.

A further detailed description of information-level routing and publisher-level routing is provided below. For example, if a node A owns a file or content "/kbs.com/art/music/1st week/#1song.mp3", the node A may advertise the corresponding content when the corresponding content is very popular. Also, a node B residing in the same domain as the node A may receive the advertisement for the corresponding content.

If the node B receives a packet requesting the corresponding content "/kbs.com/art/music/1st week/#1song.mp3", the node B may transmit, to the node A, the packet requesting the content "/kbs.com/art/music/1st week/#1song.mp3". That is, since the content may be advertised, an interest packet requesting the content may be routed using the advertisement for the corresponding content. Hence, information-level routing may be used.

If the corresponding content "/kbs.com/art/music/1st week/#1song.mp3" becomes unpopular two weeks after the advertising, the node A deletes the corresponding content and ceases the advertising of the corresponding content. Accordingly, the node B may no longer know where to transmit the received packet requesting the corresponding content due to failure of the advertising of the corresponding content from the node A. The node B may test whether routing paths are present for the following content names, in a sequential order:

/kbs.com/art/music/1st week/#1song.mp3
/kbs.com/art/music/1st week/
/kbs.com/art/music/
/kbs.com/art/
/kbs.com/

If the routing paths for the above content names are not found, the node B may transmit the packet requesting the corresponding content to an originator of the corresponding content, namely, a publisher, "/kbs.com/". As described in the foregoing, publisher-level routing may refer to the transmission of the packet requesting the corresponding content directly to the publisher. In addition, longest prefix matching may be executed in the above sequential order to determine whether a routing path for a name of the corresponding content is present. Accordingly, more efficient routing in a domain may be achieved by switching to publisher-level routing when information that a node intends to find through information-level routing is absent in a local area within a domain.

Figure 6:
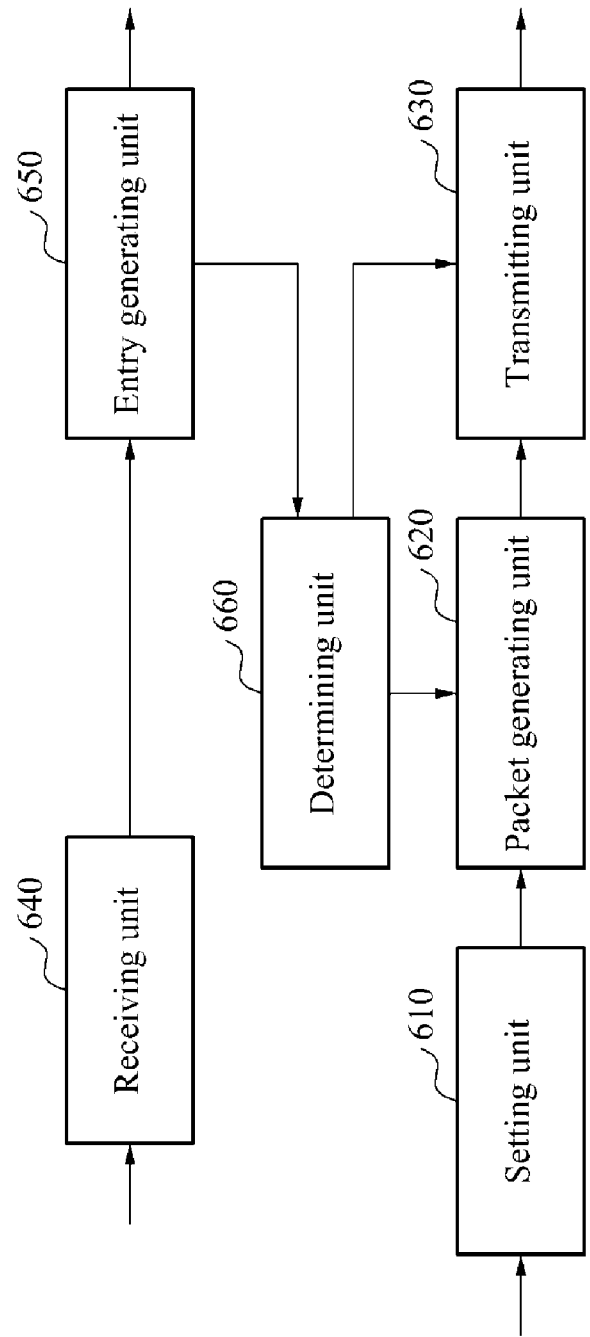
FIG. 6 is a block diagram illustrating an example of a node.

FIG. 6 illustrates an example of a node. Referring to FIG. 6, the node advertises information in a CCN, and includes a setting unit 610, a packet generating unit 620, a transmitting unit 630, a receiving unit 640, an entry generating unit 650, and a determining unit 660.

The setting unit 610 sets an advertisement area.

The packet generating unit 620 generates an interest packet including the set advertisement area to limit an area to which the information requested by the node is limited to be advertised. The packet generating unit 620 generates the interest packet based on a result of a determination by the determination unit 660, e.g., when the determining unit 660 determines that the information requested by the node is not advertised.

The transmitting unit 630 transmits the interest packet within the advertisement area. The transmitting unit 630 may broadcast the interest packet within the advertisement area in which the node is included.

When a reception of a reply to the transmission or broadcast fails, the packet generating unit 620 generates a new interest packet requesting the information requested by the node. The transmitting unit 630 transmits the new interest packet to an originator of the information through longest prefix matching.

The receiving unit 640 receives, from another node corresponding to a provider, advertised information based on a popularity of the advertised information. The popularity of the advertised information may be determined based on an access count of the advertised information.

The entry generating unit 650 generates an entry of an FIB of the node for the advertised information.

The determining unit 660 determines whether the information requested by the node is advertised, based on the entry of the FIB. When the determining unit 660 determines that the information requested by the node is advertised, the transmitting unit 630 transmits the interest packet to the other node corresponding to the provider of the advertised information via a corresponding face of the entry of the FIB.

Figure 7:
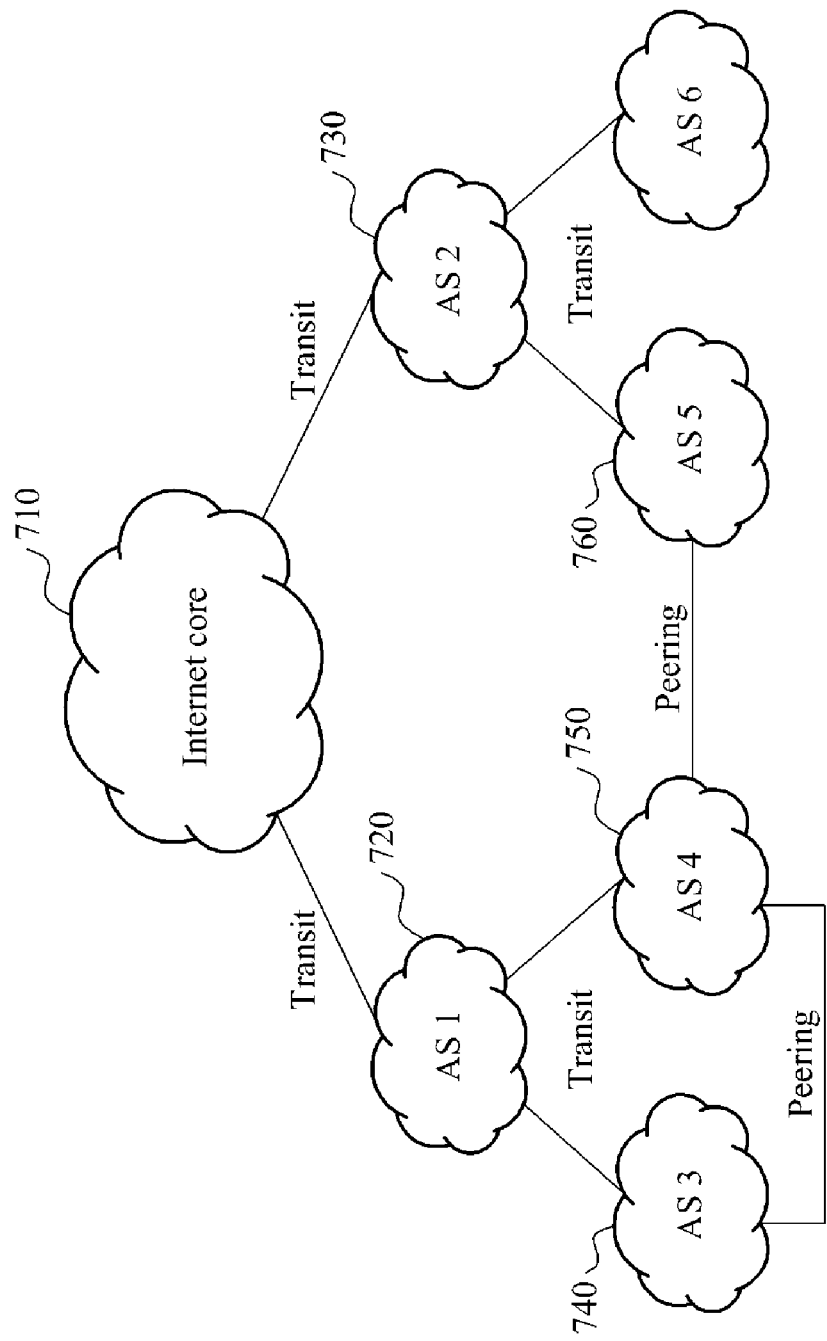
FIG. 7 is a diagram illustrating an example of an inter-domain network.

FIG. 7 illustrates an example of an inter-domain network. Referring to FIG. 7, each domain of the inter-domain network may be an autonomous system (AS), and may be assigned a natural number from 0 to 65,535 as an identification (ID).

In a connection to an Internet core 710 through an AS, a connection between ASs may be termed a "transit". For example, in FIG. 7, a connection between an AS 1 720 and an AS 4 750, or a connection between an AS 2 730 and an AS 5 760, may be a transit.

Also, a connection between ASs independent from a connection to the Internet core 710 may be termed a "peering". For example, in FIG. 7, a connection between an AS 3 740 and the AS 4 750, or a connection between the AS 4 750 and the AS 5 760, may be a peering.

A routing method may be primarily implemented for a transit. A transit between ASs allows an AS connected to the Internet core 710 to provide a disconnected AS with connectivity to the Internet core 710, and hence, may be known as a relation of a customer and a provider. For example, the AS 1 720 providing connectivity to the Internet core 710 may be referred to as a provider AS, and the AS 3 740 and the AS 4 750 connected to the Internet core 710, using the AS 1 720 as a transit AS, may be referred to as a customer AS.

In an IP-based network, the AS 1 720 may transmit an IP packet. For this purpose, a customer AS may determine whether a packet is to be transmitted based on a policy between ASs. The ASs may set the policy, and may exchange information of the policy.

However, in a CCN, a cache hit for a content cache may be a factor as well as a packet transmission. This concern may be only associated with a transit AS because whether a cache hit for a content cache is permitted in a transit AS is one of factors determining an amount of link usage between the transit AS and an Internet core. However, when a cache hit for the content cache is permitted, a response time taken to respond to a request from a customer AS may be reduced to improve a satisfaction level of a user of the customer AS. Accordingly, in examples, whether a cache hit for the content cache is permitted in the transit AS, a level in which a cache hit ratio in the content cache of the transit AS needs to be maintained, and a cache size to be allocated to an AS, may be policies.

In inter-domain routing, routing information including policy information between domains or ASs may be exchanged using a sync tree. The sync tree may include connectivity information, for example, routing information, between a domain in which a corresponding node is included and another domain. A method of exchanging the routing information between the domains, or a method of applying a policy, may be similar to those used in an IP-based network, and thus a detailed description is omitted herein.

Figure 8:
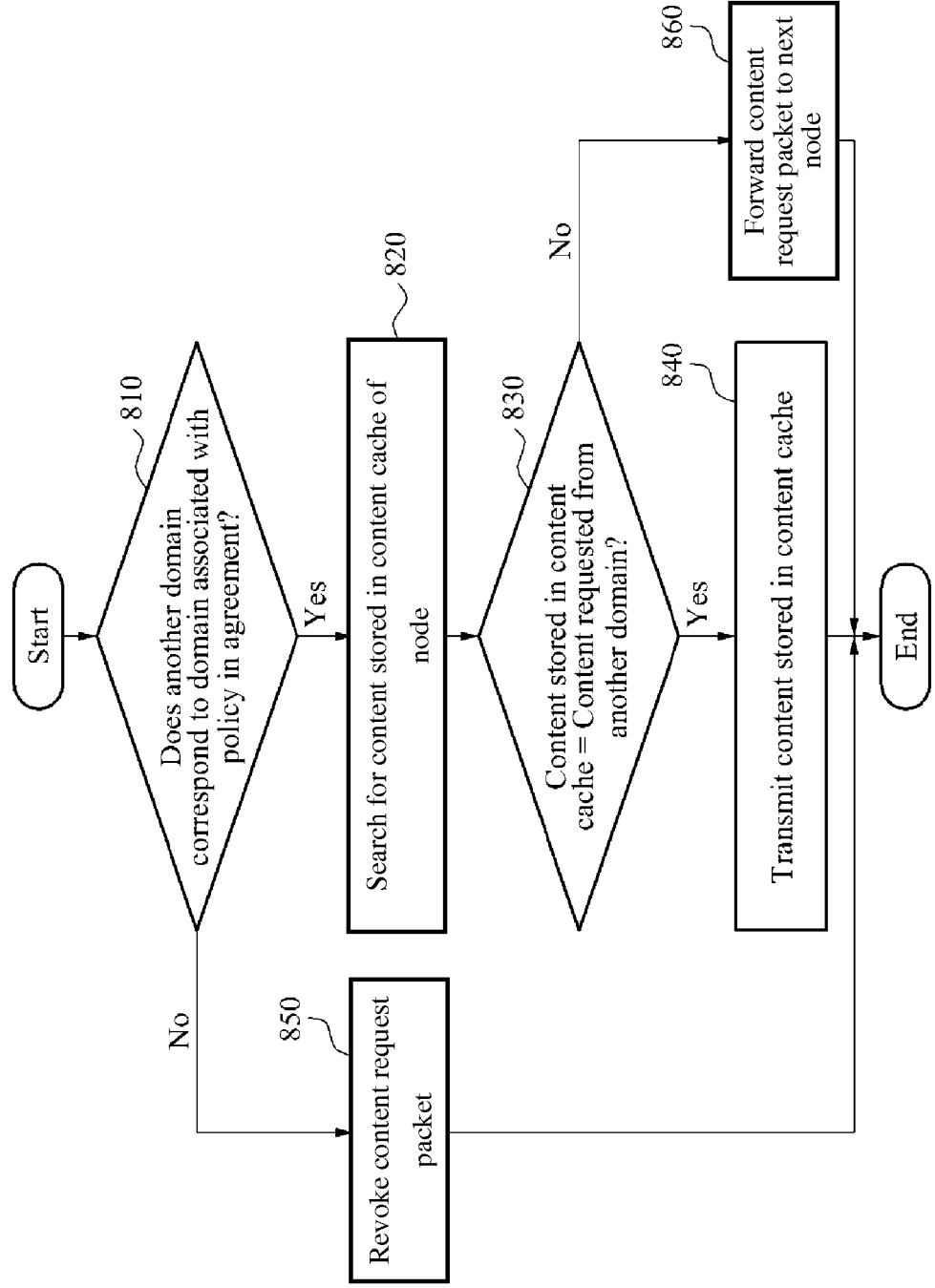
FIG. 8 is a flowchart illustrating an example of a routing method in an inter-domain network in a CCN.

FIG. 8 illustrates an example of a routing method in an inter-domain network in a CCN. Referring to FIG. 8, in operation 810, a node included in a domain of the inter-domain network determines whether another domain corresponds to a domain associated with a policy in agreement, when the node receives a content request packet or interest packet from the other domain. The policy may include at least one domain agreed to in a cache look-up contract, a contract for a cache hit ratio, and/or a contract for a cache size to be allocated, including the domain in which the node is included.

The cache look-up contract may be for access to content stored in a content cache of a corresponding node, namely, for permission for a cache hit. The cache hit ratio contract may be for a hit ratio of content being provided. For example, if music content and movie content are located in a domain A, the domain A may provide 40% of the music content and 60% of the movie content to a domain B contracted with the domain A.

The content request packet may include a field indicating a domain by which the content request packet is generated. Accordingly, the field may be used to determine whether the other domain is associated with the policy in agreement. For example, if the domain A agrees with the domain B, in which a node X is included, about a cache look-up contract and/or a contract for a cache hit ratio, the domain A may set the domain A or information of the domain A in a field of a content request packet that indicates a domain, to indicate that the content request packet is transmitted from the domain A when the content request packet is transmitted to the domain B. Accordingly, the domain B may recognize that the content request packet is transmitted from the domain A based on the information set in the field, and may accept the cache look-up contract or the contract for the cache hit ratio for the content request packet. For this purpose, for example, the node X may exchange routing information and other information, with the domain A, based on the policy in agreement, using a sync tree including connectivity information between the domain B and the domain A.

When the other domain is determined to be associated with the policy in agreement, the node continues in operation 820. Otherwise, the node continues in operation 850.

In operation 820, the node searches for a content stored in a content cache of the node.

In operation 850, the node revokes or discards the content request packet received from the other domain, without forwarding the content request packet to a next node. The node ends the method. The next node may be within the same domain as the node or a different domain from the node.

In operation 830, the node determines whether the content stored in the content cache matches a content requested by the other domain based on the content request packet. When the content stored in the content cache is determined to match the content request from the other domain, the node continues in operation 840. Otherwise, the node continues in operation 860.

In operation 840, the node transmits the content stored in the content cache to the other domain.

In operation 860, the node forwards the content request packet to the next node. Also, the node may exchange, with the other domain, routing information based on the policy in agreement, using sync tree including connectivity information between the domain and the other domain.

Figure 9:
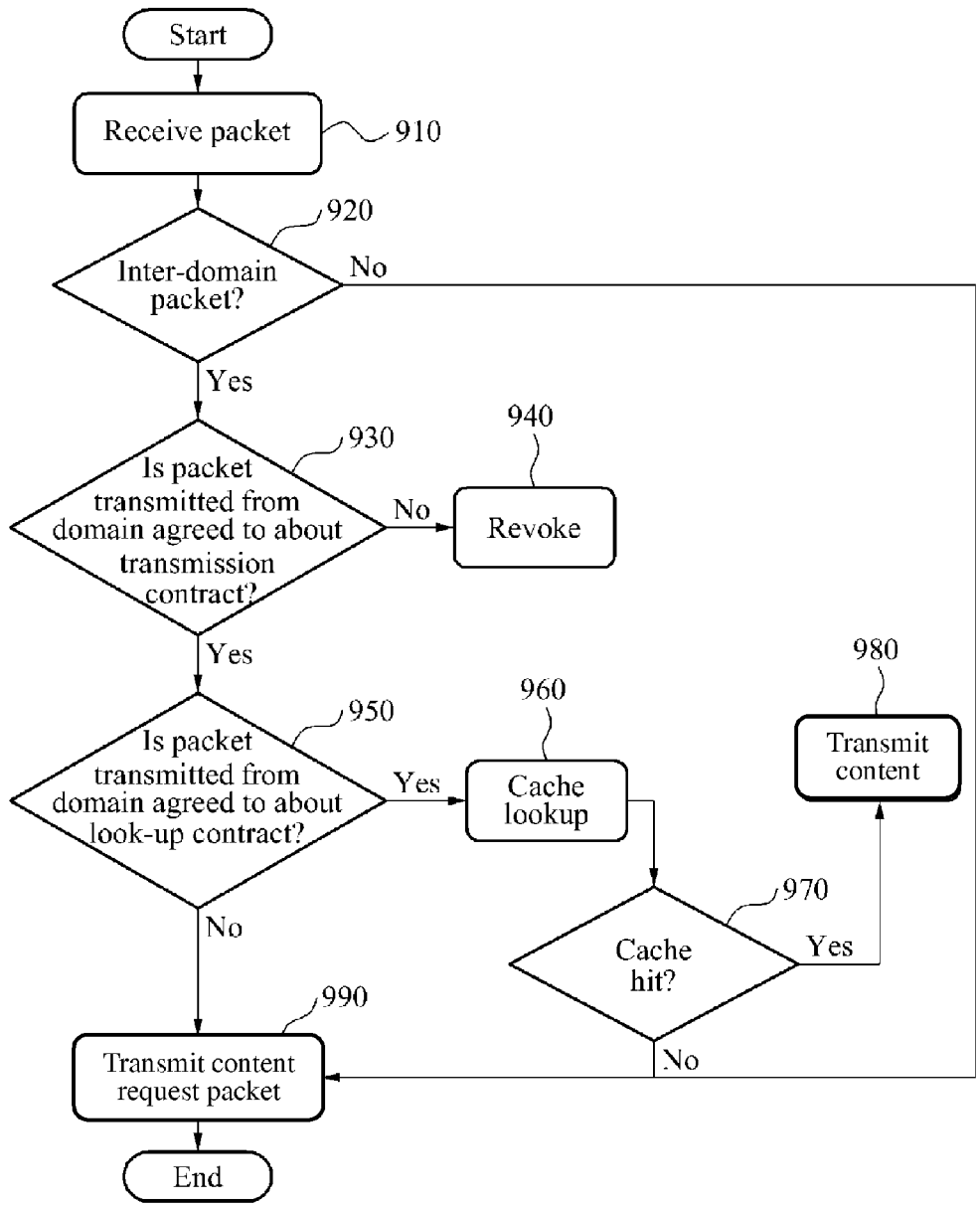
FIG. 9 is a flowchart illustrating another example of a routing method in an inter-domain network in a CCN.

FIG. 9 illustrates another example of a routing method in an inter-domain network in a CCN. Referring to FIG. 9, in operation 910, a node included in a domain receives a packet (e.g., a content request packet or interest packet) from another domain.

In operation 920, the node determines whether the packet is an inter-domain packet between domains. When the packet is determined to be an inter-domain packet, the node continues in operation 930. Otherwise, the node continues in operation 990.

In operation 930, the node determines whether the inter-domain packet is transmitted from a domain agreed to about a packet transmission contract. If the other domain is determined to be agreed to in the packet transmission contract, the node continues in operation 950. Otherwise, the node continues in operation 940.

In operation 940, the node revokes or discards the inter-domain packet.

In operation 950, the node determines whether the inter-domain packet is transmitted from a domain agreed to about a cache look-up contract. If the other domain is determined to be agreed to in the cache look-up contract, the node continues in operation 960. Otherwise, the node continues in operation 990.

In operation 960, the node performs a cache look up of a content stored in a content cache of the node.

In operation 970, the node determines whether there is a cache hit, namely, whether the content stored in the content cache matches a content requested by the other domain based on the inter-domain packet. When it is determined there is the cache hit, the node continues in operation 980. Otherwise, the node continues in operation 990.

In operation 980, the node transmits the content stored in the content cache to the other domain.

In operation 990, the node forwards the content request packet to a next node.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a terminal or device described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A routing method executed by a node in a content centric network (CCN), the method comprising:
    receiving an interest packet;
    determining whether a content corresponding to the interest packet is advertised based on a forwarding information base (FIB) of the node;
    in response to the content corresponding to the interest packet being advertised, transmitting the interest packet via a face, the face being determined based on the FIB;
    in response to the content corresponding to the interest packet not being advertised, broadcasting the interest packet within a constrained area and sequentially testing routing paths of successively higher address with respect to a hierarchy of names of the content; and
    in response to a reply packet corresponding to the broadcasting not being received, transmitting the interest packet toward a publisher of the content.

2. The method of claim 1, wherein the transmitting of the interest packet toward the publisher of the content comprises:
    generating a new packet requesting the content to the publisher; and
    transmitting the new packet to the publisher.

3. The method of claim 2, wherein the transmitting of the new packet comprises transmitting the new packet to the publisher, using longest prefix matching.

4. The method of claim 1, wherein the constrained area has a range from another node to a router connected to an Internet core on a hierarchical basis.

5. The method of claim 1, wherein the FIB is generated based on information broadcasting the content within a predetermined area.

6. The method of claim 5, wherein whether the content is to be broadcasted is determined based on a popularity of the content.

7. The method of claim 6, wherein the popularity of the content is determined based on an access count of the content.

8. The method of claim 1, wherein the interest packet comprises a name of the content and an operation identification (OID) designating a control operation to be performed by another node in the constrained area, in response to the interest packet being received.

9. A non-transitory computer-readable storage medium storing a program comprising instructions to cause a computer to perform the method of claim 1.

10. The method of claim 1, wherein the transmitting of the interest packet toward the publisher of the content comprising:
    determining whether a domain transmitting the interest packet requesting the content is associated with a policy;
    finding the content within the node based on a result of the determination;
    if a content stored in the node matches the content requested by the domain, transmitting the stored content; and
    if a content stored in the node does not match the content requested by the domain, transmitting the interest packet toward the publisher of the content.

11. The method of claim 10, wherein the interest packet comprises a field indicating a domain by which the interest packet is generated.

12. The method of claim 10, wherein the policy identifies a domain of the node and the transmitting domain that are agreed to in a cache look-up contract, a contract for a cache hit ratio, a contract for a cache size to be allocated, or any combination thereof.

13. The method of claim 12, wherein the determining comprises determining whether the transmitting domain is associated with the policy based on a field indicating a domain in the interest packet.

14. The method of claim 10, further comprising exchanging, with the transmitting domain, routing information based on the policy and using a sync tree comprising connectivity information between the domain of the node and the transmitting domain.

15. A node in a content centric network (CCN), the node comprising:
    a receiver configured to receive an interest packet;
    a determiner configured to determine whether a content corresponding to the interest packet is advertised based on a forwarding information base (FIB) of the node; and
    a transmitter configured to transmit the interest packet via a face, the face being determined based on the FIB in response to the content corresponding to the interest packet being advertised, and broadcast the interest packet within a constrained area in response to the content corresponding to the interest packet not being advertised,
    wherein the determiner is further configured to determine whether a reply packet corresponding to the broadcasting is received, and the node is configured to sequentially test routing paths of successively higher addresses with respect to a hierarchy of names of the content and the transmitter is further configured to transmit the interest packet toward a publisher of the content in response to the reply packet corresponding to the broadcasting not being received.

16. The node of claim 15, further comprising:
    a packet generator configured to generate a new packet requesting the content to the publisher,
    wherein the transmitter is further configured to transmit the new packet to the publisher.

17. The node of claim 16, wherein the transmitting unit is further configured to transmit the new packet to the publisher, using longest prefix matching.

18. The node of claim 15, wherein the FIB is generated based on information broadcasting the content within a predetermined area.

19. The node of claim 18, wherein whether the content is to be broadcasted is determined based on a popularity of the content.

20. The node of claim 19, wherein the popularity of the advertised information is determined based on an access count of the advertised information.

21. The node of claim 15, wherein the constrained area has a range from another node to a router connected to an Internet core on a hierarchical basis.

22. The node of claim 15, wherein the interest packet comprises a name of the content and an operation identification (OID) designating a control operation to be performed by another node in the constrained area, in response to the interest packet being received.

23. The node of claim 15, wherein:
the determiner is further configured to determine whether a domain transmitting the interest packet requesting the content is associated with a policy, and find the content within the node based on a result of the determination; and
the transmitter is further configured to transmit the stored content in response to a content stored in the node matching the content requested by the domain, and transmit the interest packet toward the publisher of the content in response to a content stored in the node not matching the content requested by the domain.

24. The node of claim 23, wherein the interest packet comprises a field indicating a domain by which the interest packet is generated.

25. The node of claim 23, wherein the policy identifies a domain of the node and the transmitting domain that are agreed to in a cache look-up contract, a contract for a cache hit ratio, a contract for a cache size to be allocated, or any combination thereof.

26. The node of claim 25, wherein the determiner is further configured to determine whether the transmitting domain is associated with the policy based on a field indicating a domain in the interest packet.

27. The node of claim 23, wherein the transmitter is further configured to exchange, with the transmitting domain, routing information based on the policy and using a sync tree comprising connectivity information between the domain of the node and the transmitting domain.

\* \* \* \* \*